United States Patent [19]

Starke

[11] 4,216,604
[45] Aug. 12, 1980

[54] FISHING ROD TIP GUARD

[76] Inventor: Burnett H. Starke, 1320 E. 9th St., Hutchinson, Kans. 67501

[21] Appl. No.: 5,569

[22] Filed: Jan. 22, 1979

[51] Int. Cl.³ .................. A01K 87/00; A01K 97/06
[52] U.S. Cl. .................................. 43/25.2; 43/26; 43/44.95
[58] Field of Search ............... 43/25, 25.2, 26, 24, 43/44.95

[56] References Cited

U.S. PATENT DOCUMENTS

| 2,491,182 | 12/1949 | Jaske | 43/25 X |
| 2,639,869 | 5/1953 | Levine | 43/25 X |
| 2,650,449 | 9/1953 | Suring | 43/26 |
| 2,742,728 | 4/1956 | Boyd | 43/22 X |
| 2,767,502 | 10/1956 | Reynolds | 43/25.2 |
| 2,885,817 | 5/1959 | Carter | 43/25 |
| 3,399,009 | 8/1968 | Slade | 43/26 X |

Primary Examiner—Nicholas P. Godici
Attorney, Agent, or Firm—Edward L. Brown, Jr.

[57] ABSTRACT

A fishing rod tip guard comprising a plastic case with a hinged top into which the tip is placed in an interior slot and the top closed and fastened. The slot prevents the guard from slipping off the tip. There is also room in the guard for the hook or lures that are attached to the line. A modification of the guard makes it useful as a bobber also.

4 Claims, 8 Drawing Figures

FISHING ROD TIP GUARD

BACKGROUND OF THE INVENTION

This invention relates to an attachment for a fishing rod. It is a device for protecting a tip of the fishing rod from breakage while being transported. More particularly, but not exclusively, the invention can also enclose a fish hook to prevent accidental injury and snagging while the rod is being carried out while it is being transported in a vehicle.

Guards for fishing hooks are well known. Two hook guards which are attachable to the rod are U.S. Pat. No. 3,800,456, Rowe and U.S. Pat. No. 2,767,502, Reynolds. These hook guards do not, however, guard the tip of the rod from breakage. This tip is easily broken off, being at the thinnest section of the rod. Loss of the tip makes the rod relatively useless.

SUMMARY OF THE INVENTION

The tip of the rod includes a line guide projecting at an angle from the rod which sometimes causes the rod to get wedged into a crevice in a vehicle's trunk or interior. This often causes the tip to break off when the rod is picked up. The rod tip guard of this invention encloses the line guide at the tip of the rod and also encloses an adjacent part of the rod. The guard is free of projections preventing the guard and the enclosed tip from getting caught in a crevice, thus avoiding breakage of the tip. A cover of the guard opens to allow a hook to be placed into a hook chamber and the tip of the rod inserted into a tip chamber. The guard is then closed around the tip of the rod. The tip is held in the tip chamber in the closed outer end of the guard by a snug-fitting notch in an interior partition. The inner end of the guard has a slot permitting closure around the rod. Fastening means for keeping the guard closed are also included.

It is an object of the invention to provide a simple and easily operated guard to protect the tip of the fishing rod from breakage while being transported.

It is a further object of the invention to combine guarding of the tip and guarding of the hook into a single device and to accomplish both objectives in a single operation.

It is a further object of the invention to make the guard useful also as a bobber when desired.

BRIEF DESCRIPTION OF THE DRAWING

In the drawing accompanying this specification, for illustration, there is shown a preferred embodiment of the invention and in this drawing.

DESCRIPTION OF THE PREFERRED EMBODIMENTS

Figure 2:
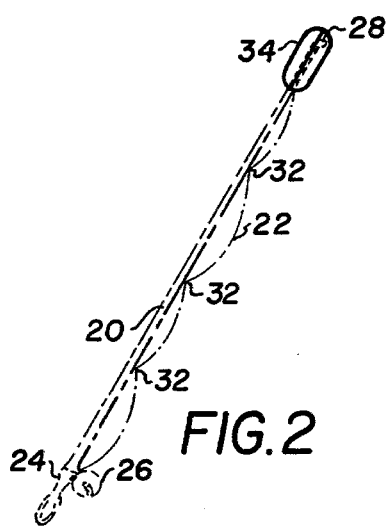
FIG. 2 is a perspective view showing the relative location of the closed device on the fishing rod.
Figure 1:
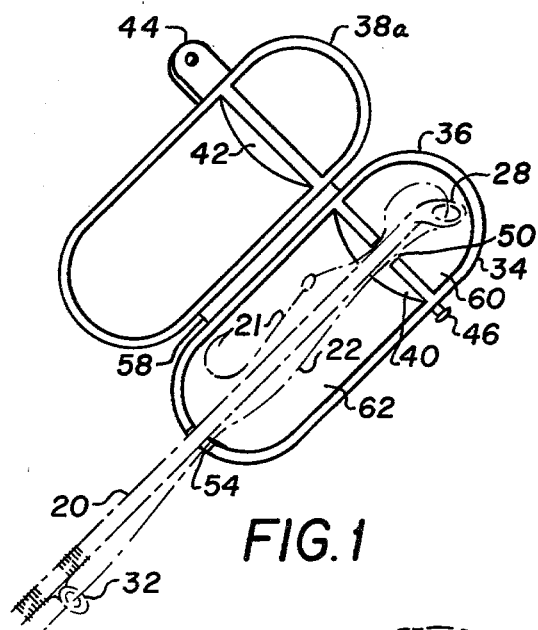
FIG. 1 is a perspective view of the device in its open state and attached to the fishing rod.

Turning now to the drawing, FIG. 2 shows a conventional fishing rod 20 with a line 22, a grip 24, a reel 26, a tip 28, and line guides 32. FIG. 2 also shows the location of a rod tip guard 34 at the outer end of the rod 20. The invention is more clearly seen in FIG. 1, which shows the guard 34 in its open state. The guard 34 comprises a guard case 36 and a guard cover 38a attached to the case 36 with a hinge 58. The case 36 holds the tip 28 and a fish hook 21 on end of the line 22. The tip 28 is in a tip chamber 60 formed in the case 36 by a lower partition 40 which has a tip slot 50 sized to a snug fit about the rod 20 near the tip 28. The hook 21 while remaining attached to the line 22 is positioned in a hook chamber 62 of the guard case 36. A slot 54 for the rod 20 in the inner end of the case 36 permits the cover 38 to close against the case 36 enclosing the tip 28 and the hook 21. The cover 38a has an upper partition 42 aligned with the lower partition 40 and a flap 44 forming a snap fastener when mating with a stud 46 on the case 36. The guard 34 can be made in various shapes other than the one shown on the drawing as long as it covers the tip, as well as a portion of the adjoining rod 20, and when closed fits around the rod closely enough so that the tip 28 prevents the guard 34 from slipping off the rod 20.

Figures 3, 4:
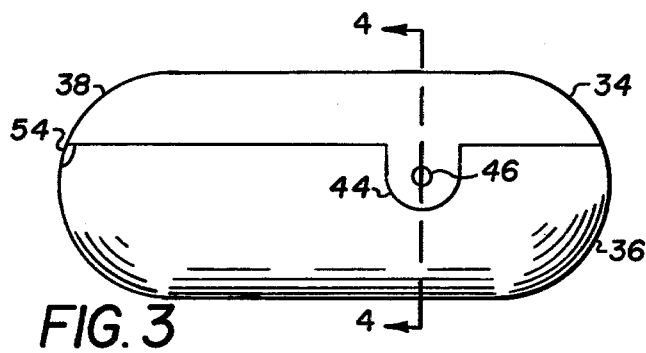
FIG. 3 is a side elevational view of the device in its closed state.
FIG. 4 is a transverse cross-sectional view of the device in its closed state and, in dotted lines, in its open state.

FIG. 3 is drawn to approximate actual size of a small tip guard 34, and the largest size will be approximately twice as large. The preferred embodiment is to form the entire guard 34 by injection molding in one piece from a strong but elastic plastic, including the cover, hinge, and fastening means.

FIG. 3 shows the guard 34 in its closed state with the cover 38 held closed by the flap 44 being snapped over the stud 46. The slot 54 for the rod 20 permits the guard 34 to be closed around the tip 28. FIG. 4 shows the guard 34 in cross section with the cover 38 closed and fastened with the flap 44 snapped over the stud 46. Shown in dotted lines is the cover 38a in open position. The tip slot 50 is sized to accept the rod 20 approximate the tip 28 with a fit on the rod snug enough to prevent passage of the tip 28.

Figure 5:
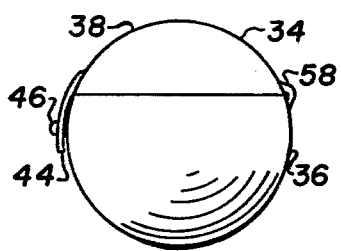
FIG. 5 is an end view of the outer end of the closed device.
Figure 6:
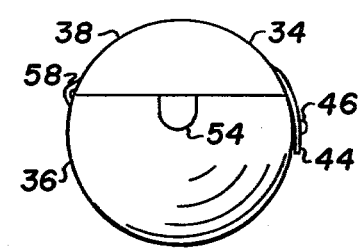
FIG. 6 is an end view of the inner end of the closed device.
Figure 7:
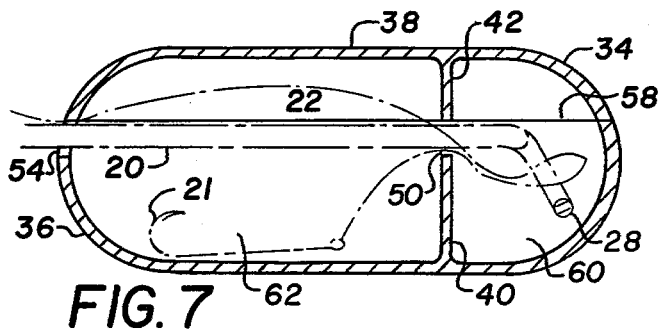
FIG. 7 is a longitudinal cross-sectional view of the closed device taken along line 7—7 of FIG. 4 showing the rod tip, hook, and line inside of the device.

FIGS. 5 and 6 show outer and inner end views of the guard 34 with the rod slot 54 on the inner end. FIG. 7 shows a sectional view of the guard 34 with the rod 20 in place. There is sufficient tolerance between slots 50 and 54 to pass the fishing line 22. The chamber 62 is sufficiently large to contain various size hooks or a fishing lure.

Figure 8:
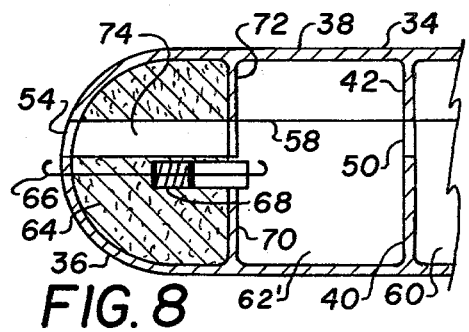
FIG. 8 is a partial cross-sectional view, taken similarly to FIG. 7, but showing a modification of the device enabling it to be used also as a bobber.

A modification which makes the tip guard 34 useful also as a bobber is shown in FIG. 8. A filling of foam flotation material 64 is placed in the inner end of the guard 34. A lower partition 70 and an upper partition 72 separate the foam 64 from a hook chamber 62'. A passageway 74, in line with the rod slot 54 is left through the foam 64 and the lower partition 70. The case 36, the cover 38, the hinge 58, the partitions 40 and 42, and the tip chamber 60 are similar to the embodiment shown in FIG. 7. The FIG. 8 bobber modification also shows a spring-biased bobber attachment wire 66 including a spring 68 holding the bobber to the fishing line.

The invention in its preferred embodiment has been described in detail sufficient for one skilled in the art to make it. Obviously this embodiment may be changed or modified without departing from the spirit of the invention and it will be appreciated that my invention is not limited to the disclosed embodiment.

I claim:

1. A guard for protecting the tip of a fishing rod from breakage comprising:
   a longitudinal case having inner and outer end walls, and a slot in said inner end wall for receipt of the rod;
   a partition laterally positioned in the case having a second slot therein for receipt of the rod, the partition being longitudinally positioned with respect to the slot in the inner end wall of the case;
   a longitudinal cover means for the case which closes both of said slots to restrain the rod in the case;
   a tip chamber between the partition and said outer end wall of the case for enclosing the tip and preventing any longitudinal movement of the rod in the case; and
   means for fastening the cover to the case.

2. A guard as recited in claim 1 in which the fastening means comprises a molded hinge connecting one side of the cover to the case and a molded snap fastener on the opposite side thereof.

3. A guard as recited in claim 1 further comprising a hook chamber extending from the partition toward the inner end wall of the case making possible guarding the tip and the hook in a single enclosure in a single operation.

4. A guard as recited in claim 1 further comprising a fill of foam flotation material and a spring-loaded line clamp in a portion of the case so that the guard can be readily attached to the line to serve as a bobber.

* * * * *